United States Patent
You et al.

(10) Patent No.: US 10,562,994 B2
(45) Date of Patent: *Feb. 18, 2020

(54) POLYOLEFIN FOR PREPARING FIBER AND FIBER COMPRISING THE SAME

(71) Applicant: LG CHEM, LTD., Seoul (KR)

(72) Inventors: Young Suk You, Daejeon (KR); Se Young Kim, Daejeon (KR); Soon Ho Sun, Daejeon (KR); Eun Kyoung Song, Daejeon (KR); Seung Mi Lee, Daejeon (KR); Yi Young Choi, Daejeon (KR); Ki Soo Lee, Daejeon (KR); Sun Mi Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/548,736

(22) PCT Filed: Mar. 28, 2016

(86) PCT No.: PCT/KR2016/003133
§ 371 (c)(1),
(2) Date: Aug. 3, 2017

(87) PCT Pub. No.: WO2016/204387
PCT Pub. Date: Dec. 22, 2016

(65) Prior Publication Data
US 2018/0016370 A1 Jan. 18, 2018

(30) Foreign Application Priority Data

Jun. 15, 2015 (KR) .................. 10-2015-0084238
Feb. 15, 2016 (KR) .................. 10-2016-0017315

(51) Int. Cl.
| C08F 110/02 | (2006.01) |
| C08F 4/6592 | (2006.01) |
| D01F 6/04 | (2006.01) |
| C08F 4/659 | (2006.01) |

(52) U.S. Cl.
CPC ............. *C08F 110/02* (2013.01); *D01F 6/04* (2013.01); *C08F 4/65908* (2013.01); *C08F 4/65912* (2013.01); *C08F 4/65916* (2013.01); *C08F 2420/02* (2013.01); *C08F 2500/01* (2013.01); *C08F 2500/03* (2013.01)

(58) Field of Classification Search
CPC .... C08F 110/02; C08F 210/02; C08F 4/6592; C08F 4/65904
See application file for complete search history.

(56) References Cited

U.S. PATENT DOCUMENTS

| 6,605,676 | B1 | 8/2003 | Vega et al. |
| 2007/0043176 | A1 | 2/2007 | Martin et al. |
| 2007/0043182 | A1 | 2/2007 | Martin et al. |
| 2007/0060722 | A1 | 3/2007 | Jayaratne et al. |
| 2008/0004460 | A1 | 1/2008 | Jayaratne et al. |
| 2009/0198078 | A1 | 8/2009 | Jayaratne et al. |
| 2009/0280310 | A1 | 11/2009 | Nitta et al. |
| 2012/0022212 | A1 | 1/2012 | Ayabe et al. |
| 2012/0259077 | A1 | 10/2012 | Ha et al. |
| 2012/0329966 | A1 | 12/2012 | Kwon et al. |
| 2013/0046068 | A1 | 2/2013 | Kwon et al. |
| 2013/0079483 | A1 | 3/2013 | Robert et al. |
| 2016/0304637 | A1 | 10/2016 | Lee et al. |
| 2017/0291969 | A1 | 10/2017 | Lee et al. |
| 2017/0298538 | A1 | 10/2017 | Bae et al. |

FOREIGN PATENT DOCUMENTS

| EP | 2 428 525 A2 | 3/2012 |
| EP | 2816064 A1 | 12/2014 |
| EP | 3199556 A1 | 8/2017 |
| JP | 8-245712 A | 9/1996 |
| JP | 2003-128716 A | 5/2003 |
| JP | 2009-299051 A | 12/2009 |
| JP | 2010-150265 A | 7/2010 |
| JP | 2013-521371 A | 6/2013 |
| JP | 2013-521398 A | 6/2013 |
| JP | 2016-538373 A | 12/2016 |
| JP | 2017-531702 A | 10/2017 |
| KR | 10-2008-0047596 A | 5/2008 |
| KR | 10-2010-0121449 A | 11/2010 |
| KR | 10-2011-0050171 A | 5/2011 |
| KR | 10-2011-0107865 A | 10/2011 |
| KR | 10-2013-0124593 A | 11/2013 |
| KR | 10-2014-0067410 A | 6/2014 |
| WO | 2012/004674 A2 | 1/2012 |

*Primary Examiner* — Caixia Lu
(74) *Attorney, Agent, or Firm* — Dentons US LLP

(57) ABSTRACT

The present invention relates to polyolefin powder for preparing fiber, and fiber comprising the same. According to the present invention, provided is polyolefin, which exhibits a high molecular weight range and narrow molecular weight distribution and in which the formation of a gel deteriorating the quality of fiber is reduced. Therefore, by using the polyolefin, the present invention exhibits molecular weight, density and narrow molecular weight distribution, which are equivalent to those of conventional polyolefin, but the number of gels having a large particle diameter is remarkably reduced, and therefore, the present invention can provide fiber having excellent tenacity and tensile strength half-life.

16 Claims, No Drawings

POLYOLEFIN FOR PREPARING FIBER AND FIBER COMPRISING THE SAME

FIELD OF THE INVENTION

Cross Reference to Related Applications

This application is a National Stage Application of International Application No. PCT/KR2016/003133 filed on Mar. 28, 2016, which claims the benefit of Korean Patent Application No. 10-2015-0084238 filed on Jun. 15, 2015 and Korean Patent Application No. 10-2016-0017315 filed on Feb. 15, 2016, all of which are hereby incorporated by reference in their entirety for all purposes as if fully set forth herein.

The present invention relates to polyolefin powder for preparing fiber, and fiber comprising the same. More specifically, the present invention relates to polyolefin for preparing fiber that exhibits high molecular weight and narrow molecular weight distribution, but has high tenacity since gel formation is reduced, and fiber comprising the same.

DESCRIPTION OF THE RELATED ART

In order to prepare high tenacity fiber such as a rope, a fishing net, etc., high density polyethylene is used, and the properties of high draw, high tenacity, etc. are required for the high density polyethylene.

Meanwhile, it is known that the mechanical properties of fiber products are more excellent as the molecular weight distribution of high density polyethylene is narrower. That is, if the molecular weight distribution of high density polyethylene is narrow, it has high draw ratio property, and may have high tenacity due to high drawing. However, if the molecular weight distribution of high density polyethylene is too narrow, processability may be deteriorated.

Meanwhile, in the method of preparing polyethylene using commercially widely applied Ziegler-Natta catalyst, it is difficult to obtain polymer having uniform molecular weight, and the molecular weight distribution is wide.

Although polyethylene having wide molecular weight distribution has good processability, it has disadvantages in that mechanical properties are deteriorated, and low molecular weight parts are eluted during processing, and thus, the original properties of resin are deteriorated.

In order solve these problems, suggested is a method of preparing polyethylene having narrow molecular weight distribution using metallocene catalyst system. However, in order to be applied for the existing commercial processes such as a slurry process, a gas-phase process, metallocene should be supported in an appropriate carrier, but supported metallocene catalysts used so far have disadvantages in that molecular weight distribution widens and catalytic activity is lowered.

And, in case a hybrid supported catalyst comprising a metallocene catalyst for preparing high molecular weight polymer is used, resin comprising a high molecular weight region of polyolefin formed by the catalyst for preparing high molecular weight polymer may not be properly dissolved during the extrusion process and may be agglomerated, thus forming polymer gel. The formation of gel causes the generation of single yarn in the process of drawing, and thus, becomes a significant hindrance to realization of high tenacity of resin. Therefore, there is a continued demand for the development of polyolefin suitable for the preparation of high tenacity resin having high molecular weight and narrow molecular weight distribution, i.e., resin for fiber.

SUMMARY OF THE INVENTION

In order to overcome the problems of the prior art, it is an object of the present invention to provide polyolefin powder for preparing fiber that exhibits high molecular weight and narrow molecular weight distribution, and thus, has an excellent drawing characteristic and can be highly oriented, and exhibits improved processability and high tenacity by reducing the formation of gel causing the generation of single yarn.

It is another object of the present invention to provide fiber comprising the polyolefin powder.

In order to achieve the objects, one aspect of the present invention provides polyolefin powder for preparing fiber:
wherein a weight average molecular weight is 100,000 to 300,000 g/mol;
wherein a molecular weight distribution is 2.0 to 3.2; and
when the polyolefin powder is manufactured into a casting film at 190° C., the number of gels with a particle diameter of 250 μm or more is less than 2,000 per unit area ($m^2$).

Another aspect of the present invention provides a fiber comprising the polyolefin.

According to the present invention, polyolefin powder that exhibits a high molecular weight range and narrow molecular weight distribution, in which the formation of gel deteriorating the quality a fiber is reduced, can be provided.

Therefore, by using the polyolefin, the present invention exhibits molecular weight, density and narrow molecular weight distribution, which are equivalent to those of conventional polyolefin, but the number of gels having a large particle diameter is remarkably reduced, and therefore, the present invention may provide fiber having excellent tenacity and longer tensile strength half-life.

DETAILED DESCRIPTION OF THE EMBODIMENTS

The terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, the present invention will be explained in detail.

According to one embodiment of the present invention, polyolefin powder for preparing fiber wherein a weight average molecular weight is 100,000 to 300,000 g/mol; wherein a molecular weight distribution is 2.0 to 3.2; and when the polyolefin powder is manufactured into a casting film at 190° C., the number of gels with a particle diameter of 250 μm or more is less than 2,000 per unit area (m²), is provided.

As used herein, the term "polyolefin powder" or "polyolefin resin powder" means polyolefin resin that is obtained by polymerization and exhibits the form of fine particles, and the polyolefin powder can be used for preparing fiber in itself, or can be made into a pellet form by melting and used for preparing fiber.

In the polyolefin resin for replacing high tenacity fiber, a gel, which is formed due to improper dissolving and the resulting agglomeration of a resin in an extrusion process, causes generation of single yarn in the drawing process of the resin, and thus, becomes a significant hindrance to realization of high tenacity of the resin. Particularly, although, in the case of injection molded products, the number of gel does not have a significant influence, in case extrusion molded products (high tenacity yarn) are produced, high orientation and draw is required so as to realize high tenacity of a fiber, and thus, if a lot of gels exist in the polyolefin resin, single yarns may be generated due to the gel and high quality fiber products cannot be prepared. Thus, even if other properties of the prepared resin are excellent, if a lot of gels exist in the polyolefin resin, high quality fiber products cannot be prepared. There are various causes of gel formation including property imbalance of polyolefin resin, imbalance in the polymerization process, fouling generated during polymerization, fouling due to a catalyst, and so on.

Particularly, a gel may be formed because the conventional resin comprising a high molecular weight region of polyolefin is not properly dissolved in the extrusion process. In order to overcome such a problem of gel formation, the present invention provides polyolefin powder that has weight average molecular weight and narrow molecular weight distribution, which are equivalent to those of the conventional polyolefin powder, but in which gel formation is remarkably reduced.

The measurement of the number of gels is carried out, more specifically, by manufacturing the polyolefin powder into a casting film for gel analysis (54 mm*33 m) at 190° C. over 10 minutes using a single screw extruder, and measuring the number of gels generated in the central 1 m² area (about 30 mm*about 33 m) excluding the edges of the film with a laser analyzer equipped with an extruder. Such a process is repeated 3 times, and the mean value is determined as the number of gels. Here, an area in which a refractive index difference from the remaining parts is generated in the laser analyzer, for example an area in which a refractive index difference is ±0.02 or more, is defined as a gel, and the gels may be measured while being classified into a gel with a particles diameter less than 250 μm, a gel with a particle diameter of 250 μm or more and less than 650 μm, and a gel with a particle diameter of 650 μm or more, according to the particle diameter.

According to the polyolefin powder of the present invention, when measured by the above explained method, the number of gels with a particle diameter of 250 μm per unit area (1 m²) may be less than 2,000, preferably 0 or more and less than 1,000, more preferably 0 or more and less than 500, still more preferably 0 or more and less than 300.

Preferably, the weight average molecular weight of the polyolefin of the present invention may be about 100,000 to about 300,000 g/mol, or about 150,000 to 250,000 g/mol, or greater than about 200,000 to about 250,000 g/mol.

And, the molecular weight distribution (PDI) of the polyolefin of the present invention may be about 2.0 to about 3.2, or about 2.0 to about 3.0, or about 2.2 to about 2.9, or about 2.5 to about 2.8.

According to the present invention, since the number of gels is remarkably reduced as explained above, fiber with excellent quality can be prepared, and polyolefin powder having a high molecular weight range and very narrow molecular weight distribution as explained above can be provided.

And, the melt index (190° C., 2.16 kg load condition) of the polyolefin according to the present invention may be about 0.1 to about 2.0 g/10 min, and the density may be about 0.945 to about 0.955 g/cm³. Preferably, the melt index of the polyolefin may be about 0.3 to about 1.5 g/10 min, and the density may be about 0.945 to about 0.955 g/cm³. And, it is preferable that the polyolefin is homopolymer.

The polyolefin powder of the present invention can be effectively used for the preparation of fiber exhibiting excellent tenacity and long tensile strength half-life since the number of gels having a bad influence on the quality of fiber products and particle diameter are reduced.

Herein, in the polyolefin according to the present invention, the density, melt index and molecular weight distribution properties are related to a draw ratio, tenacity and processibility exhibited when preparing high tenacity fiber products using the same.

The draw ratio is more excellent as the molecular weight distribution of polyolefin homopolymer is narrower. And the tenacity is more excellent as the draw ratio is higher, and at the same draw ratio, it is more excellent as a density is higher and a molecular weight is higher.

That is, it can be seen that molecular weight distribution should be narrow so as to realize a high draw ratio. However, the molecular weight distribution is too narrow, processibility may be deteriorated, and thus, when the molecular weight distribution is about 2.0 to about 3.2, or about 2.0 to about 3.0, or about 2.2 to about 2.9, or about 2.5 to about 2.8 as explained above, a high draw ratio and appropriate processibility can be realized. And, although tenacity is more excellent as a molecular weight is higher, i.e., a melt index is smaller, if a molecular weight is too high, a processing apparatus may be heavily loaded thus deteriorating extrusion processibility and productivity. Thus, when the melt index is about 0.1 to about 2.0 g/10 min, more preferably about 0.3 to about 1.5 g/10 min, excellent processibility may be exhibited.

And, since at the same draw ratio, strength is more excellent as density is higher, it is preferable that the polyolefin according to the present invention is homopolymer without comonomers. And, since in the homopolymer, density becomes low as molecular weight distribution is narrow and a melt index is small, in case the density of the homopolymer is about 0.945 to about 0.955 g/cm³, the melt index (MI; 190° C., 2.16 kg) is about 0.3 to about 1.5 g/10 min, and the molecular weight distribution (PDI; Mw/Mn) is about 2.0 to about 3.2, optimized high draw and high tenacity of a fiber may be exhibited. And, in the present invention, it is preferable that the polyolefin is polyethylene homopolymer.

Here, although it is preferable that the polyolefin according to the present invention is ethylene homopolymer, it may be copolymer comprising ethylene and alpha olefin comonomers, as necessary. The alpha olefin comonomers may include 1-butene, 1-pentene, 1-hexene, 4-methyl-1-pentene, 1-octene, 1-decene, 1-dodecene, 1-tetradecene, 1-hexadecene, 1-octadecene, or 1-eicosens, etc., but are not limited thereto. Among them, alpha olefins having 4 to 10 carbon number is preferable, and one kind or many kinds of alpha olefins may be used together as the comonomers. The content of the alpha olefin commoners in the copolymer may be preferably about 0.1 to about 45 wt %, more preferably about 0.1 to about 20 wt %, and most preferably about 0.1 to about 4 wt %.

The polyolefin powder according to the present invention has excellent processibility, exhibits a small number of gels per unit area when manufactured into a casting film, and has a high draw ratio and high tenacity, etc., and thus, can be used for the preparation of high tenacity fiber.

Meanwhile, according to one embodiment of the present invention, the polyolefin exhibiting the above explained properties may be obtained by polymerizing olefin monomers in the presence of a single metallocene supported catalyst comprising a metallocene compound of the following Chemical Formula 1; a first cocatalyst compound; a borated-based second cocatalyst; and a carrier.

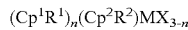   [Chemical Formula 1]

In the Chemical Formula 1, $M^1$ is Group 4 transition metal;

$Cp^1$ and $Cp^2$ are the same or different, and each independently, one selected form the group consisting of cyclopentadienyl, indenyl, 4,5,6,7-tetrahydro-1-indenyl, and fluorenyl radical, which may be substituted with C1-20 hydrocarbon, provided that all $Cp^1$ and $Cp^2$ are not cyclopentadienyl;

$R^1$ and $R^2$ are the same or different, and each independently, C1-20 alkyl, C1-10 alkoxy, C2-20 alkoxyalkyl, C6-20 aryl, C6-10 aryloxy, C2-20 alkenyl, C7-40 alkylaryl, C7-40 arylalkyl, C8-40 arylalkenyl, or C2-10 alkynyl;

X is a halogen atom, C1-20 alkyl, C2-10 alkenyl, C7-40 alkylaryl, C7-40 arylalkyl, C6-20 aryl, substituted or unsubstituted C1-20 alkylidene, substituted or unsubstituted amino group, C2-20 alkylalkoxy, or C7-40 arylalkoxy; and n is 1 or 0.

A method for preparing the single metallocene supported catalyst comprises supporting the metallocene compound of the Chemical Formula 1 on a carrier, before or after supporting a first cocatalyst (for example, an organometallic compound comprising aluminum).

Previously, in order to prepare polyolefin having molecular weight appropriate for resin for fiber, a hybrid supported catalyst comprising one kind of a catalyst for preparing high molecular weight polyolefin and one kind of a catalyst for preparing low molecular weight polyolefin was used. In case such a hybrid supported catalyst is used, although the activity and the molecular weight can be controlled according to the ratio of each catalyst, in order to obtain high molecular weight polyethylene, the catalytic activity is lowered and the molecular weight distribution becomes wide, and in case one kind of a catalyst is supported, although the molecular weight distribution is narrow, the molecular weight becomes small or catalytic activity is significantly low.

In order solve these problems, according to one embodiment of the present invention, a supported catalyst is prepared by using only a single metallocene compound and adding a borate-based compound as a second cocatalyst component. And, by controlling the amount of the second cocatalyst component to a specific range, high activity may be exhibited while maintaining narrow molecular weight distribution, which is the property of a single metallocene catalyst, and polyolefin of the present invention, of which molecular weight range is suitable for resin for fiber and in which the formation of gel is inhibited, may be prepared.

In the case of a hybrid supported catalyst comprising a catalyst for preparing high molecular weight polymer, resin comprising a high molecular weight region of polyolefin formed by the catalyst may not be properly dissolved in an extrusion process, and thus, gel may be formed. In order to overcome the problem of gel formation, by using the single supported catalyst in which the formation of gel is prevented, gel generated due to a catalyst for preparing high molecular weight polymer can be reduced.

More specifically, according to one embodiment of the present invention, by adding a borate-based compound as a second cocatalyst to prepare a single metallocene supported catalyst, and then, using the same for the polymerization of olefin monomers, the molecular weight distribution and weight average molecular weight of the obtained polyolefin can be controlled and catalytic activity can be increased.

The polyolefin prepared using such a technology has excellent mechanical properties, and in the polyolefin, gel formation is reduced and thus the generation of single yarn is inhibited, and the polyolefin is appropriate for resin for fiber with excellent tenacity and draw ratio.

Hereinafter, a method for preparing a single metallocene supported catalyst used for olefin polymerization of the present invention will be explained in detail.

In the single metallocene supported catalyst, the mole ratio of metal included in the metallocene compound:boron included in the borate-based second cocatalyst may be about 1:0.5 to about 1:3, or about 1:0.8 to about 1:2, or about 1:0.9 to about 1:1.5. If the mole ratio is less than 1:0.5, catalytic activity may be lowered, and if it is greater than 1:3, although the activity is excellent, polymerization reactivity is not uniform and thus process operation is not easy.

And, in the single metallocene supported catalyst, specific examples of the substituents of the Chemical Formula 1 are as follows.

The C1 to C20 alkyl group may include a linear or branched alkyl group, and specifically, a methyl group, an ethyl group, a propyl group, an isopropyl group, an n-butyl group, a tert-butyl group, a pentyl group, a hexyl group, a heptyl group, an octyl group, etc.

The C2 to C20 alkenyl group may include a linear or branched alkenyl group, and specifically, an alkyl group, an ethenyl group, a propenyl group, a butenyl group, a pentenyl group, etc.

The C6 to C20 aryl group may include a monocyclic or polycyclic aryl group, and specifically, a phenyl group, a biphenyl group, a naphthyl group, a phenanthrenyl group, a fluorenyl group, etc.

The C1 to C10 alkoxy group may include a methoxy group, an ethoxy group, a phenyloxy group, a hexyloxy group, etc.

The C2 to C20 alkoxyalkyl group may include a methoxymethyl group, a tert-butoxymethyl group, a tert-butoxyhexyl group, a 1-ethoxyethyl group, a 1-methyl-1-methoxyethyl group, etc.

The Group 4 transition metal may include titanium, zirconium, hafnium, etc.

The metallocene compound represented by the Chemical Formula 1 may be the compound represented by one of the following Structural Formulas, but is not limited thereto.

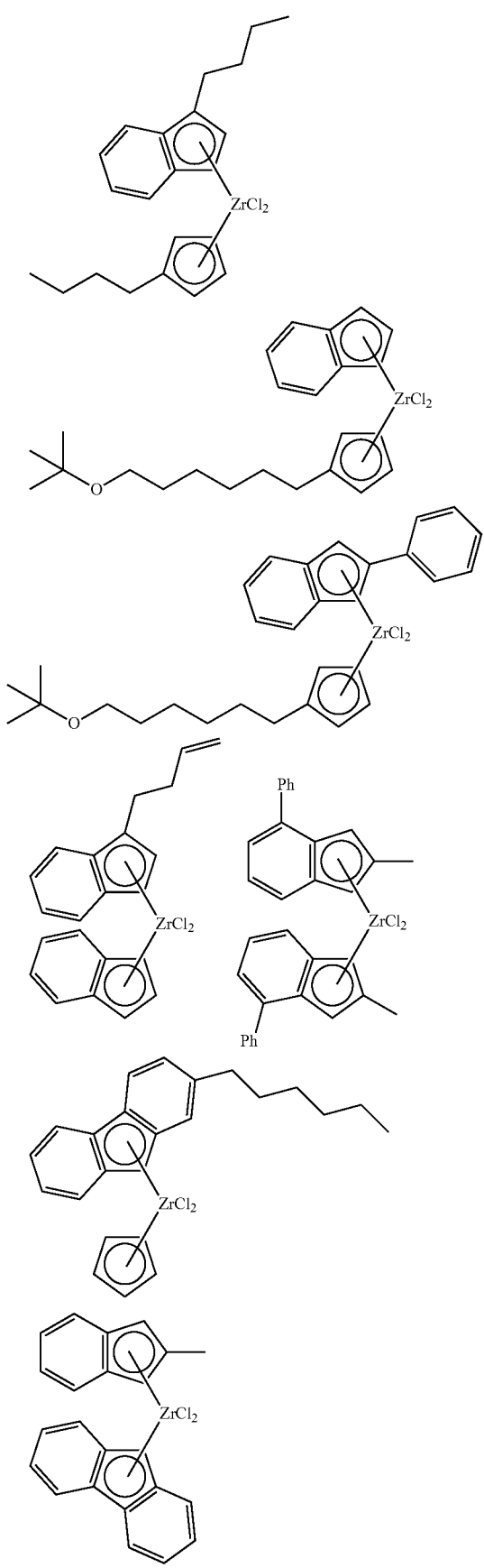
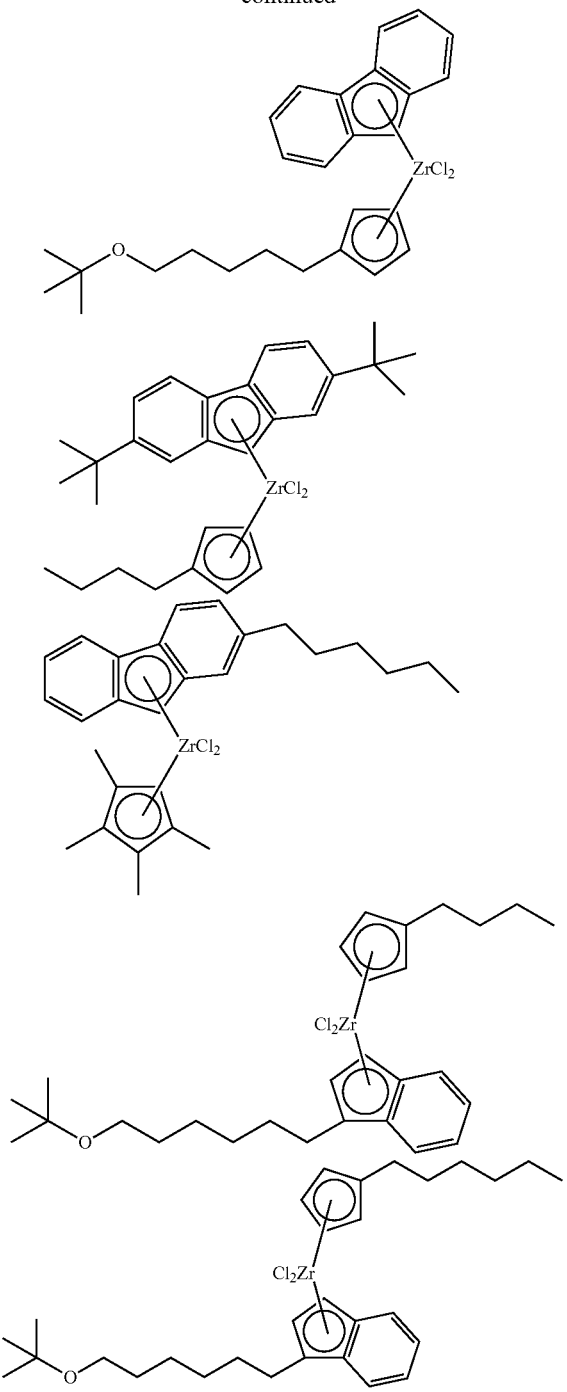

-continued

In the single metallocene supported catalyst, the carrier for supporting the metallocene compound may contain a hydroxy group on the surface. That is, although the smaller the amount of the hydroxy groups (—OH) on the surface of the carrier, the better, it is practically difficult to remove all the hydroxy groups. Thus, the amount of the hydroxy groups may be controlled by the preparation method and conditions of a carrier or drying conditions (temperature, time, drying method, etc.), etc. For example, it is preferable that the amount of the hydroxy groups on the surface of the carrier becomes 0.1 to 10 mmol/g, more preferably 0.5 to 1 mmol/g. If the amount of the hydroxy groups is less than 0.1 mmol/g, the sites for reaction with a cocatalyst may decrease, and if it is greater than 10 mmol/g, there is a possibility that the hydroxy groups are derived from moisture other than the hydroxy groups existing on the surface of a carrier, which is not preferable.

Here, in order to reduce side reactions due to the few hydroxy groups remaining after drying, a carrier in which the hydroxy groups are chemically removed while conserving siloxane groups with high reactivity for involvement in the supporting, may be used.

In that case, it is preferable that the carrier has highly reactive hydroxy groups and siloxane groups together on the surface. Examples of the carrier may include high temperature dried silica, silica-alumina, or silica-magnesia, etc., which may commonly contain oxide, carbonate, sulfate or nitrate components such as $Na_2O$, $K_2CO_3$, $BaSO_4$, or $Mg(NO_3)_2$, etc.

It is preferable that the carrier is sufficiently dried before the first and second cocatalysts, etc. are supported. Here, the drying temperature of the carrier is preferably 200 to 800° C., more preferably 300 to 600° C., and most preferably 400 to 600° C. If the drying temperature of the carrier is less than 200° C., moisture on the surface may react with the cocatalysts due to too much moisture, and if it exceeds 800° C., pores on the surface of the carrier may be combined to reduce the surface area, and a lot of hydroxy groups on the surface may disappear and only siloxane groups may remain, thus decreasing the reaction sites with the cocatalyst, which is not preferable.

Meanwhile, the single metallocene catalyst may comprise a first cocatalyst and a second cocatalyst so as to make active catalyst species. By using the two kinds of cocatalyst, catalytic activity may be improved, and particularly, by using the second cocatalyst, the molecular weight distribution of polyolefin can be controlled.

As the first cocatalyst, any cocatalysts used when polymerizing olefins in the presence of a common metallocene catalyst may be used. By the first cocatalyst, a bonding between the hydroxy groups and Group 13 transition metal in the carrier is generated. And, the first cocatalyst may contribute to securing of the unique properties of the single metallocene supported catalyst of the present invention without fouling in which polymer particles are coagulated to the wall surface of the reactor or with each other.

In the single metallocene supported catalyst, the first cocatalyst may be one or more kinds selected from the group consisting of the compounds represented by the following Chemical Formulas 2 and 3:

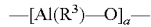  [Chemical Formula 2]

  [Chemical Formula 3]

In the Chemical Formulas 2 and 3, $R^3$ may be identical or different, and each independently, halogen, or C1-20 hydrocarbyl unsubstituted or substituted with halogen, and a is an integer of 2 or more, $R^4$ may be identical or different, and each independently, halogen; C1-20 hydrocarbon, or C1-20 hydrocarbon substituted with halogen, D is aluminum or boron.

Examples of the compounds represented by the Chemical Formula 2 may include methylaluminoxane, ethylaluminoxane, isobutylaluminoxane, butylaluminoxane, etc., and methylaluminoxane is more preferable.

Examples of the compound represented by the Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tollylaluminum, dimethylaluminum mexhoxide, dimethylaluminum ethoxide, trimethylboron, triethylboron, triisobutylboron, tripropylboron, tributylboron, etc., and preferably, it may be selected from trimethylaluminum, triethylaluminum, or triisobutylaluminum.

Meanwhile, the borate-based second cocatalyst included in the single metallocene catalyst, in which the present invention is characterized, may be a borate-based compound represented by the following Chemical Formula 4 or 5,

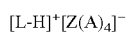  [Chemical Formula 4]

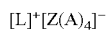  [Chemical Formula 5]

In the Chemical Formulas 4 and 5, each L is independently neutral or cationic Lewis acid, each H is independently a hydrogen atom, each Z is independently boron, and each A is independently halogen of hydrogen valence of 1 or more, a C1-20 hydrocaryl group, an alkoxy group, a phenoxy group, a C6-20 aryl or alkyl group substituted by nitrogen, phosphorus, sulfur or oxygen atom.

It may be preferable that the borate-based second cocatalyst comprises trityltetrakis(pentafluorophenyl)borate, N,N-dimethylaniliniumtetrakis(pentafluorophenyl)borate, trimethylammoniumtetrakis(pentafluorophenyl)borate, triethylammoniumtetrakis(pentafluorophenyl)borate, or tripropylammoniumtetrakis(pentafluorophenyl)borate. As such a cocatalyst is used for the preparation of polyolefin suitable for preparing fiber, specificity of use and specificity of preparation method are exhibited.

Meanwhile, when preparing the single metallocene catalyst, it is preferable that the sequence of supporting of each component comprises the steps of supporting a metallocene compound of the Chemical Formula 1, before or after supporting the first cocatalyst on a carrier, as explained above; and supporting the borate-based second cocatalyst on the carrier.

And, the supporting conditions are not specifically limited, and the supporting may be conducted within a range well known to one of ordinary knowledge in the art. For example, it may be progressed by appropriately using high temperature supporting and low temperature supporting, and specifically, the supporting of the first cocatalyst and the second cocatalyst may be progressed at a temperature of about 25 to about 100° C. Here, the supporting time of the first cocatalyst and the supporting time of the second cocatalyst may be appropriately controlled according to the amount of the cocatalyst to be supported. And, the temperature at which the metallocene compound and the carrier react may be about −30° C. to about 150° C., preferably room temperature to about 100° C., more preferably about 30 to about 80° C. The supported catalyst that has been reacted may be used as it is by removing reaction solvents by filtration or vacuum distillation, and if necessary, it may be soxhlet filtered with aromatic hydrocarbon such as toluene and be used.

Meanwhile, the olefin monomers used when copolymerizing olefin monomers may be one or more kinds selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene and 1-eicosene.

And, when copolymerizing olefin monomers, the metallocene supported catalyst may be diluted in the form of slurry in a C5-12 aliphatic hydrocarbon solvent such as isobutene, pentane, hexane, heptane, nonane, decane and isomers thereof; an aromatic hydrocarbon solvent such as toluene and benzene; a hydrocarbon solvent substituted with a chlorine atom such as dichloromethane and chlorobenzene, etc., and be introduced. It is preferable that the solvent is treated with a small amount of aluminum to remove a small amount of water, air, etc. acting as catalyst poison, before use.

The polymerization of olefin monomers may be conducted by a standard method while continuously supplying olefin monomers at a constant ratio, using a reactor selected from the group consisting of a continuous slurry polymerization reactor, a loop slurry reactor, a gas phase reactor and a solution reactor alone, or using two or more identical or different reactors.

When polymerizing the olefin monomers, the polymerization temperature is preferably about 25 to about 500° C., more preferably about 25 to about 200° C., and still more preferably about 50 to about 150° C. And, the polymerization pressure is preferably about 1 to about 100 Kgf/cm$^2$, more preferably about 1 to about 70 Kgf/cm$^2$, and most preferably about 5 to about 50 Kgf/cm$^2$.

Meanwhile, according to still another embodiment of the present invention, fiber comprising the above described polyolefin is provided.

The fiber comprising the polyolefin may have tenacity measured according to ASTM D 638, of about 13 or more, for example, about 13 to about 20 gf/denier, or about 13 to about 18 gf/denier.

Although the tenacity of previously used general-purpose fiber was just about 4 to about 6 gf/denier, the fiber according to the present invention exhibits the above explained tenacity, and thus, it can be seen that the fiber according to the present invention has very excellent high tenacity and high draw ratio properties.

In general, narrow molecular weight distribution is required so that a fiber such as a monofilament product exhibits high tenacity, and olefin polymer for monofilament is prepared using a kind of catalyst precursor so as to realize narrow molecular weight distribution. Here, the present invention, in order to realize further enhanced high tenacity, uses the above explained supported catalyst of a single metallocene compound when preparing polyolefin, and thus, the molecular weight distribution of polyolefin is narrow, the mechanical properties are improved, and the tenacity can be enhanced.

The fiber according to the present invention is a high tenacity light-weight product, and can reduce the amount of resin used when preparing fiber exhibiting the same tenacity, and thus, it can reduce not only production cost, but also the weight of a product.

And, the fiber of the present invention has a tensile strength half-life, which measures tensile strength decrease under accelerating condition with a xenon-arc lamp according to ATCC method #16, after measuring tensile strength according to ASTM D 638, of 250 hours or more, for example, about 250 to about 350 hours, or about 300 to about 320 hours. That is, in the present invention, the tensile strength half-life of fiber represents a value confirming and measuring tensile strength decrease by UV according to AATCC method #16 used for discoloration test. And, it is the result of test with acceleration with a xenon-arc lamp under more severe condition.

Here, fiber durability is improved as the tensile strength half-life is longer, and since the present invention exhibits a half-life of the above explained range, which is longer than conventional fiber, fiber with very excellent durability can be provided.

The fiber may be prepared using the above described resin composition comprising polyolefin, by a process step with an extruder.

In the preparation method of fiber according to the present invention, the resin composition comprising polyolefin may comprise other additives. Specifically, the additives may include a heat stabilizer, an antioxidant, an UV absorber, a light stabilizer, a metal inactivator, filler, a reinforcing agent, a plasticizer, a lubricant, an emulsifier, pigment, optical bleach, a flame retardant, an antistatic agent, a foaming agent, etc. The kind of the additives is not specifically limited, and those commonly used in the art may be used.

The fiber may be provided as various articles. Specific examples of the article comprising the fiber may include articles that can be prepared using high tenacity fiber, such as monofilament products such as a rope, a fishing net, a safety net, a sport net, etc., tarpaulin products such as a cover, a gunny sack, a hose, a tent, etc., a multifilament rope, safety gloves, a protection product, etc.

Hereinafter, the action and the effects of the present invention will be explained in detail, through the specific examples of the invention. However, these examples are presented only as the illustration of the invention, and the scope of the invention is not limited thereby.

EXAMPLE

Synthesis of Metallocene Compounds

Synthesis Example 1

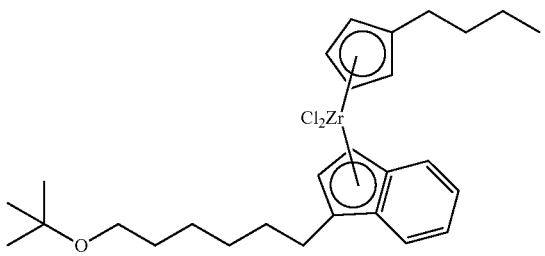

Into a well dried 250 mL Schlenk flask, 11.6 mL (100 mmol) of indene was introduced and diluted in 80 mL of THF, and the solution was stirred. 48 mL of a 2.5M nBuLi hexane solution was slowly added thereto, and after 3 hours, 18.3 g (95 mmol) of 6-chloro hexyl tert-butyl ether was added and reacted for about 12 hours. It was observed that the reaction mixture turned into a light pink suspension as the reaction progressed. After the reaction was completed, 100 mL of water was added to the mixture, followed by extraction with 100 mL of ether three times or more. The collected organic layer was dried with MgSO$_4$, followed by solvent removal by vacuum filtration, and additional vacuum distillation at 100° C., 20 mmHg, thus obtaining pure tether-indene ligand with 90% yield.

$^1$H NMR (500 MHz, CDCl$_3$): 1.22 (9H, s), 1.62 (2H, m), 1.77 (2H, m), 2.58 (2H, m), 3.36 (2H, s), 3.42 (2H, m), 6.28 (1H, s), 7.19 (1H, m), 7.24 (1H, m), 7.40 (1H, m), 7.48 (1H, m)

10 mmol of the obtained ligand was dissolved in 45 mL of ether, and then, 5 mL (1.25 equivalents) of a nBuLi hexane solution was added thereto. After 6 hours, 20 g (0.95 equivalents) of an nBuCpZrCl$_3$ toluene solution (0.273 g/mmol) was slowly added thereto at −78° C., and the temperature was raised, and then, the solution was additionally stirred for a day. The reaction mixture was passed through a filter to obtain a filtrate, which was concentrated, extracted with 100 mL hexane, and concentrated again to obtain the title compound with 90% or more yield.

$^1$H NMR (500 MHz, CDCl$_3$): 0.93 (3H, t), 1.15 (9H, s), 1.24~1.55 (10H, m), 1.58~1.64 (2H, m), 3.34 (2H, m), 5.77 (0.5H, s), 5.82 (1H, m), 6.02 (0.5H, s), 6.40 (1H, s), 6.62 (1H, s), 7.26 (2H, m), 7.42 (2H, m)

Synthesis Example 2

Preparation of (tBu-O—(CH$_2$)$_6$)(CH$_3$)Si(C$_5$(CH$_3$)$_4$)(tBu-N)TiCl$_2$ 50 g of Mg(s) was added to a 10 L reactor at room temperature, and then, 300 mL of THF was added thereto. After about 0.5 g of I$_2$ was added, the temperature of the reactor was adjusted to 50° C. After the temperature of the reactor was stabilized, 250 g of 6-t-buthoxyhexyl chloride was added to the reactor at 5 mL/min using a feeding pump. It was observed that the temperature of the reactor increased by about 4 to 5° C. as 6-t-butoxyhexyl chloride was added. While continuously adding 6-t-butoxyhexyl chloride, the solution was stirred for 12 hours. After the reaction for 12 hours, a black reaction solution was obtained. 2 mL of the produced black solution was taken, water was added to obtain an organic layer, and 6-t-buthoxyhexane was confirmed through 1H-NMR. It could be seen from the 6-t-butoxyhexane that a Grignard reaction progressed well. Thus, 6-t-buthoxyhexyl magnesium chloride was synthesized.

500 g of MeSiCl$_3$ and 1 L of THF were added to a reactor, and the reactor was cooled to −20° C. 560 g of the synthesized 6-t-buthoxyhexyl magnesium chloride was added to the reactor at 5 mL/min using a feeding pump. After the feeding of the Grignard reagent was completed, the solution was stirred for 12 hours while slowly raising the temperature to room temperature. After the reaction for 12 hours, it was confirmed that white MgCl$_2$ salts were produced. 4 L of hexane was added, and the salts were removed through labdori to obtain a filtered solution. The obtained filtered solution was added to a reactor, and then, hexane was removed at 70° C. to obtain a light yellow liquid. It was confirmed through 1H-NMR that the obtained solution is methyl(6-t-buthoxy hexyl)dichlorosilane as desired.

1H-NMR (CDCl$_3$): 3.3 (t, 2H), 1.5 (m, 3H), 1.3 (m, 5H), 1.2 (s, 9H), 1.1 (m, 2H), 0.7 (s, 3H)

1.2 moles (150 g) of tetramethylcyclopentadiene and 2.4 L of THF were added to a reactor, and then, the reactor was cooled to −20° C. 480 mL of n-BuLi was added to the reactor at a speed of 5 mL/min using a feeding pump. After adding n-BuLi, the solution was stirred for 12 hours while slowly raising the temperature of the reactor to room temperature. After the reaction for 12 hours, an equivalent of methyl(6-t-buthoxy hexyl)dichlorosilane(326 g, 350 mL) was rapidly added to the reactor. After the solution was stirred for 12 hours while slowly raising the temperature of the reactor to room temperature, the reactor was cooled again to 0° C., and then, 2 equivalents of t-BuNH$_2$ was added. While slowly raising the temperature of the reactor to a room temperature, the solution was stirred for 12 hours. After the reaction for 12 hours, THF was removed, 4 L of hexane was added, the salts were removed through labdori to obtain a filtered solution. After adding the filtered solution to a reactor again, hexane was removed at 70° C. to obtain a yellow solution. It was confirmed through 1H-NMR that the obtained yellow solution was a methyl(6-t-buthoxyhexyl)(tetramethylCpH)t-butylaminosilane compound.

To the dilithium salt of ligand of −78° C. synthesized from n-BuLi and ligand dimethyl(tetramethylCpH)t-butylaminosilane in a THF solution, TiCl$_3$(THF)$_3$ (10 mmol) was rapidly added. The reaction solution was stirred for 12 hours while slowly raising the temperature from −78° C. to room temperature. After stirring for 12 hours, an equivalent of PbCl$_2$ (10 mmol) was added to the reaction solution at room temperature, and the solution was stirred for 12 hours. After stirring for 12 hours, a bluish black solution was obtained. THF was removed in the produced reaction solution, and then, hexane was added to filter the product. After removing hexane in the obtained filtered solution, it was confirmed through 1H-NMR that desired methyl(6-t-buthoxyhexyl)silyl(η5-tetramethylCp)(t-butylamido)TiCl$_2$ of tBu-O—(CH$_2$)$_6$)(CH$_3$)Si(C$_5$(CH$_3$)$_4$)(tBu-N)TiCl$_2$ was obtained.

1H-NMR (CDCl$_3$): 3.3 (s, 4H), 2.2 (s, 6H), 2.1 (s, 6H), 1.8~0.8 (m), 1.4 (s, 9H), 1.2 (s, 9H), 0.7 (s, 3H)

Synthesis Example 3

A t-Butyl-O—(CH$_2$)$_6$—Cl was prepared using 6-chlorohexanol by the method suggested in the document (Tetrahedron Lett. 2951 (1988)), and was reacted with NaCp to obtain t-Butyl-O—(CH$_2$)$_6$—C$_5$H$_5$ (yield 60%, b.p. 80° C./0.1 mmHg).

And, the t-Butyl-O—(CH$_2$)$_6$—C$_5$H$_5$ was dissolved in THF at −78° C., n-BuLi was slowly added thereto, the temperature of the solution was raised to a room temperature, and then, the solution was reacted for 8 hours. The synthesized lithium salt was slowly added to a suspension of ZrCl$_4$(THF)$_2$ (1.70 g, 4.50 mmol)/THF (30 mL) at −78° C. again, and the solution was further reacted at room temperature for 6 hours.

All the volatile materials were vacuum dried, and a hexane solvent was added to the obtained oily liquid material to filter. The filtered solution was vacuum dried, and hexane was added to induce precipitation at a low temperature (−20° C.). The obtained precipitate was filtered at a low temperature to obtain a compound [tBu-O—(CH$_2$)$_6$—C$_5$H$_4$]$_2$ZrCl$_2$ in the form of white solid (yield 92%).

$^1$H NMR (300 MHz, CDCl$_3$): 6.28 (t, J=2.6 Hz, 2H), 6.19 (t, J=2.6 Hz, 2 H), 3.31 (t, 6.6 Hz, 2 H), 2.62 (t, J=8 Hz), 1.7-1.3 (m, 8 H), 1.17 (s, 9 H).

$^{13}$C NMR (CDCl$_3$): 135.09, 116.66, 112.28, 72.42, 61.52, 30.66, 30.61, 30.14, 29.18, 27.58, 26.00.

Preparation of Metallocene Supported Catalysts

Preparation Example 1

Into a glass reactor, 49.7 mL of a 10 wt % methylaluminoxane(MAO)/toluene solution was introduced, 9.1 g of silica (product name: Grace 952, particle size: 30 μm, surface area: 300 m$^2$/g, pore volume: 1.6 mL/g, pore diameter: 20 nm) was introduced at 40° C., and then, the solution was stirred at 200 rpm for 16 hours while raising the temperature of the reactor to 60° C. Thereafter, the temperature was lowered again to 40° C., 441 mg of the metallocene compound of Synthesis Example 1 was dissolved in toluene in a solution state and introduced, and the solution was stirred for 2 hours. Next, 730 mg of N,N-dimethylaniliniumtetrakis(pentafluorophenyl)borate was dissolved in 20 mL of toluene and introduced in a solution state, and then, the solution was stirred at 40° C. for 2 hours. After the reaction was completed, stirring was stopped, a toluene layer was separated and removed, and then, remaining toluene was removed by pressure reduction at 40° C., thus preparing a single metallocene supported catalyst.

Preparation Example 2

Into a glass reactor, 56.3 mL of a 10 wt % methylaluminoxane(MAO)/toluene solution was introduced, 9.1 g of silica (product name: Grace 952, particle size: 30 μm, surface area: 300 m²/g, pore volume: 1.6 mL/g, pore diameter: 20 nm) was introduced at 40° C., and then, the solution was stirred at 200 rpm for 16 hours while raising the temperature of the reactor to 60° C. Thereafter, the temperature was lowered again to 40° C., 441 mg of the metallocene compound of Synthesis Example 1 was dissolved in toluene in a solution state and introduced, and the solution was stirred for 2 hours. Next, 730 mg of N,N-dimethylaniliniumtetrakis(pentafluorophenyl)borate was dissolved in 20 mL of toluene and introduced in a solution state, and then, the solution was stirred at 40° C. for 2 hours. After the reaction was completed, stirring was stopped, a toluene layer was separated and removed, and then, remaining toluene was removed by pressure reduction at 40° C., thus preparing a single metallocene supported catalyst.

Comparative Example 1

Into a glass reactor, 49.7 mL of a 10 wt % methylaluminoxane(MAO)/toluene solution was introduced, 9.1 g of silica (product name: Grace 952, particle size: 30 μm, surface area: 300 m²/g, pore volume: 1.6 mL/g, pore diameter: 20 nm) was introduced at 40° C., and then, the solution was stirred at 200 rpm for 16 hours while raising the temperature of the reactor to 60° C. Thereafter, the temperature was lowered again to 40° C., 461 mg of the metallocene compound of Synthesis Example 2 and 275 mg of the metallocene compound of Synthesis Example 3 were dissolved in toluene in a solution state and introduced, and the solution was stirred for 2 hours. Next, 1.095 mg of N,N-dimethylaniliniumtetrakis(pentafluorophenyl)borate was dissolved in 20 mL of toluene and introduced in a solution state, and then, the solution was stirred at 40° C. for 2 hours. After the reaction was completed, stirring was stopped, a toluene layer was separated and removed, and then, remaining toluene was removed by pressure reduction at 40° C., thus preparing a hybrid metallocene supported catalyst.

Comparative Example 2

Into a glass reactor, 56.3 mL of a 10 wt % methylaluminoxane(MAO)/toluene solution was introduced, 9.1 g of silica (product name: Grace 952, particle size: 30 μm, surface area: 300 m²/g, pore volume: 1.6 mL/g, pore diameter: 20 nm) was introduced at 40° C., and then, the solution was stirred at 200 rpm for 16 hours while raising the temperature of the reactor to 60° C. Thereafter, the temperature was lowered again to 40° C., 461 mg of the metallocene compound of Synthesis Example 2 and 275 mg of the metallocene compound of Synthesis Example 3 were dissolved in toluene in a solution state and introduced, and the solution was stirred for 2 hours. Next, 1.095 mg of N,N-dimethylaniliniumtetrakis(pentafluorophenyl)borate was dissolved in 20 mL of toluene and introduced in a solution state, and then, the solution was stirred at 40° C. for 2 hours. After the reaction was completed, stirring was stopped, a toluene layer was separated and removed, and then, remaining toluene was removed by pressure reduction at 40° C., thus preparing a hybrid metallocene supported catalyst.

Preparation of Polyolefin

Example 1

In the presence of the single metallocene supported catalyst obtained in Preparation Example 1, ethylene was polymerized to prepare polyethylene.

Into a Parr reactor filled with argon, 400 mL of hexane was introduced, 1 g of trimethylaluminium was introduced, the inside of the reactor was dried, and hexane was discarded. 400 mL of hexane was filled again, and 0.5 g of triisobutylaluminium was introduced. In a glove box filled with argon, 10 mg of the supported catalyst of Preparation Example 1 was weighed, and then, introduced into the reactor, and argon was vented, and then, polymerization was conducted at 78° C., ethylene gas pressure of 9 bar for 1 hour.

Example 2

Polyethylene was prepared by the same method as Example 1, except that the single metallocene supported catalyst obtained in Preparation Example 2 was used.

Comparative Example 1

Polyethylene was prepared by the same method as Example 1, except that the hybrid metallocene supported catalyst obtained in Comparative Preparation Example 1 was used.

Comparative Example 2

Polyethylene was prepared by the same method as Example 1, except that the hybrid metallocene supported catalyst obtained in Comparative Preparation Example 2 was used.

The polymerization conditions and catalytic activities of the Examples 1, 2 and Comparative Examples 1, 2 were evaluated and the result are shown in Table 1.

TABLE 1

| | Supported amount of each component of supported catalysts (unit: mmol/g-SiO$_2$) | | | Activity (kgPE/g cat) |
|---|---|---|---|---|
| | First cocatalyst | Metallocene compound | Second cocatalyst | |
| Example 1 | 7.5 | Synthesis Example 1(0.1) | 0.1 | 14.1 |
| Example 2 | 8.5 | Synthesis Example 1(0.1) | 0.1 | 15.5 |
| Comparative Example 1 | 7.5 | Synthesis Example 2(0.1)/ Synthesis Example 3(0.05) | 0.15 | 11.8 |
| Comparative Example 2 | 8.5 | Synthesis Example 2(0.1)/ Synthesis Example 3(0.05) | 0.15 | 13.4 |

Referring to Table 1, the present invention could prepare polyethylene with higher activity than the existing hybrid metallocene supported catalyst, by using a borate compound as a second cocatalyst, and using a single metallocene supported catalyst in which the content of the second cocatalyst is controlled, when copolymerizing olefin.

Experimental Example

A fiber (resin) was prepared by a common method using the polyethylene of Examples 1 to 2 and Comparative Examples 1 to 2, the properties of the polyethylene powder and resin were evaluated by the following methods, and the results are shown in Tables 2 and 3.

1) Gel counting analysis: The polyolefin powder was manufactured into a casting film (54 mm*33 m) for gel analysis using a single screw extruder (Dr. Collin Company, Teachline E20T) at 190° C. over 10 minutes, and the number of gels generated in the central 1 m² area (about 30 mm*about 33 m) excluding the edges of the film was measured by a laser analyzer equipped with an extruder. Such a process was repeated three times, and then, the mean value was determined as the number of gels. Here, an area in which a refractive index difference from the remaining parts of the film is ±0.02 or more in the laser analyzer was defined as a gel, and only the gels having a particle diameter of 250 μm or more were counted.

2) density: ASTM D 1505
3) melt index (MI, 2.16 kg/10 min): measurement temperature 190° C., ASTM D 1238
4) molecular weight, molecular weight distribution: measurement temperature 160° C., A number average molecular weight, a weight average molecular weight and Z average molecular weight were measured using a gel permeation chromatography (GPC). The molecular weight distribution was indicated as a ratio of the weight average molecular weight and the number average molecular weight.
5) tensile elongation (unit: %): measured according to ASTM D 638.
6) tenacity (unit: gf/denier): A tenacity means a strength at a breaking point of a filament, and was measured according to ASTM D 638. Here, the test speed was 200 mm/min, the tenacity was measured 6 times for one specimen and the mean value was taken. For reference, denier is an international unit used to represent the thickness of a filament, and 1 g unit weight for 9,000 m standard length is determined as 1 denier.
7) tensile strength half-life: After measuring tensile strength according to ASTM D 638, the half-life of tensile strength was measured by the following method.

The tensile strength half-life was measured by confirming tensile strength decrease by UV according to AATCC method #16 used for discoloration test. And, test was conducted while accelerating with a xenon-arc lamp.

TABLE 2

| | Weight average molecular weight (unit: *10³ g/mol) | Molecular weight distribution | $MI_{2.16}$ (unit: g/10 min) | density (unit: g/cm³) | Number of gels having a particle diameter of 250 μm or more per unit area (1 m²) |
|---|---|---|---|---|---|
| Example 1 | 205 | 2.80 | 0.6 | 0.95 | 142 |
| Example 2 | 202 | 2.76 | 0.6 | 0.95 | 147 |
| Comparative Example 1 | 226 | 3.50 | 0.6 | 0.95 | 560 |
| Comparative Example 2 | 222 | 3.30 | 0.6 | 0.95 | 576 |

TABLE 3

| | Tensile elongation (unit %) | tenacity (unit: gf/denier) | Tensile strength half-life (unit: hr) |
|---|---|---|---|
| Example 1 | 15 | 15 | 304 |
| Example 2 | 15 | 15 | 307 |
| Comparative Example 1 | 15 | 7 | 243 |
| Comparative Example 2 | 15 | 7 | 245 |

Referring to Tables 2 and 3, in case the polyolefin powder of the present invention is used, the number of gels having a particle diameter of 250 μm or more was remarkably reduced while exhibiting molecular weight and density equivalent to the conventional polyolefin and molecular weight distribution narrower than the conventional polyolefin, and thus, it can be seen that excellent fiber products with high tenacity can be prepared.

In the case of hybrid supported catalysts such as Comparative Examples 1 and 2, gels having a particle diameter of 250 μm or more were formed a lot because resin comprising a high molecular weight region of polyolefin formed by the catalysts was not properly dissolved. However, the polyolefin of the present invention has weight average molecular weight similar to the conventional polyolefin and molecular weight distribution narrower than the conventional polyolefin, but reduces gels generated due to the catalyst for preparing high molecular weight polymer, and thus, can provide high tenacity fiber products.

What is claimed is:

1. A fiber prepared from a polyolefin powder:
   wherein the polyolefin powder has a weight average molecular weight is 100,000 to 300,000 g/mol;
   wherein the polyolefin powder has a molecular weight distribution is 2.0 to 3.2; and
   when the polyolefin powder is manufactured into a casting film at 190° C., the number of gels with a particle diameter of 250 μm or more, formed on the casting film, is less than 2,000 per unit area (m²), wherein a gel is defined as an area in which a refractive index difference from the remaining parts of the casting film is ±0.02 or more, detected from one surface of the casting film, and
   wherein a tenacity measured according to ASTM D 638 is 13 to 20 gf/denier.

2. The fiber according to claim 1, wherein the polyolefin powder has a melt index (MI: 190° C., 2.16kg) is 0.1 to 2.0 g/10min.

3. The fiber according to claim 1, wherein the polyolefin powder has a density is 0.945 to 0.955 g/cm³.

4. The fiber according to claim 1, wherein the polyolefin powder is prepared by the polymerization of olefin monomers in the presence of a single metallocene supported catalyst.

5. The fiber according to claim 1, wherein the polyolefin powder has a tensile strength half-life measured for UV by AATCC method #16, after measuring tensile strength according to ASTM D 638, is 250 to 350 hours.

6. The fiber according to claim 1, wherein the fiber is used as monofilament or multifilament products.

7. The fiber according to claim 1, wherein the polyolefin powder is prepared by polymerizing olefin monomers in the presence of a single metallocene supported catalyst comprising a metallocene compound of the following Chemical Formula 1; a first cocatalyst; a borated-based second cocatalyst; and a carrier.

$(Cp^1R^1)_n(Cp^2R^2)MX_{3-n}$ [Chemical Formula 1]

wherein, in Chemical Formula 1, $M^1$ is Group 4 transition metal;

$Cp^1$ and $Cp^2$ are the same or different, and each independently, one selected form the group consisting of cyclopentadienyl, indenyl, 4,5,6,7-tetrahydro-1-indenyl, and fluorenyl radical, which may be substituted with C1-20 hydrocarbon, provided that all $Cp^1$ and $Cp^2$ are not cyclopentadienyl;

$R^1$ and $R^2$ are the same or different, and each independently, C1-20 alkyl, C1-10 alkoxy, C2-20 alkoxyalkyl, C6-20 aryl, C6-10 aryloxy, C2-20 alkenyl, C7-40 alkylaryl, C7-40 arylalkyl, C8-40 arylalkenyl, or C2-10 alkynyl;

X is a halogen atom, C1-20 alkyl, C2-10 alkenyl, C7-40 alkylaryl, C7-40 arylalkyl, C6-20 aryl, substituted or unsubstituted C1-20 alkylidene, substituted or unsubstituted amino group, C2-20 alkylalkoxy, or C7-40 arylalkoxy; and n is 1 or 0.

8. The fiber according to claim 7, wherein $M^1$ is titanium, zirconium, or hafnium.

9. The fiber according to claim 7, wherein $R^1$ and $R^2$ are a methyl group, an ethyl group, a propyl group, an isopropyl group, an n-butyl group, a tert-butyl group, a pentyl group, a hexyl group, a heptyl group, an octyl group, an ethenyl group, a propenyl group, a butenyl group, a pentenyl group, a phenyl group, a biphenyl group, a naphthyl group, a phenanthrenyl group, a fluorenyl group, a methoxy group, an ethoxy group, a phenyloxy group, a hexyloxy group, a methoxymethyl group, a tert-butoxymethyl group, a tert-butoxyhexyl group, a 1-ethoxyethyl group, or a 1-methyl-1-methoxyethyl group.

10. The fiber according to claim 7, wherein the metallocene compound represented by the Chemical Formula 1 is the compound represented by one of the following Structural Formulas:

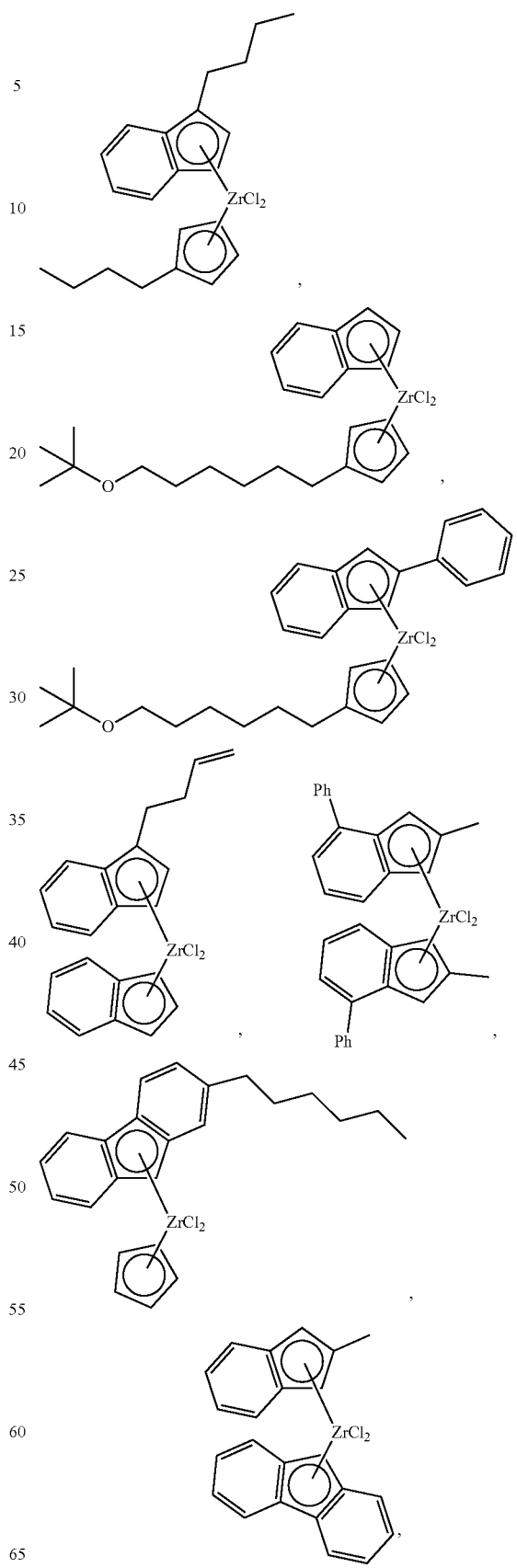

-continued

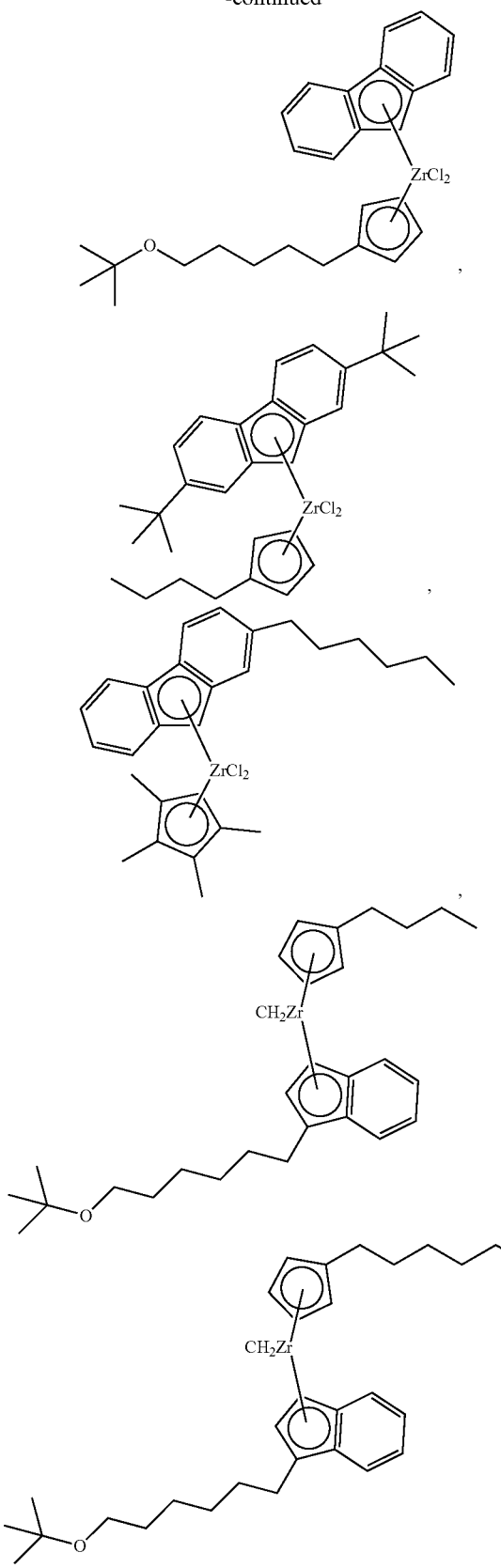

11. The fiber according to claim 7, wherein the first cocatalyst is one or more selected from the group consisting of the compounds represented by the following Chemical Formulas 2 and 3:

$$—[Al(R^3)—O]_a—$$ [Chemical Formula 2]

$$D(R^4)_3$$ [Chemical Formula 3]

wherein, in the Chemical Formulas 2 and 3, $R^3$ is identical or different, and each independently, halogen, or C1-20 hydrocarbyl unsubstituted or substituted with halogen, and a is an integer of 2 or more, $R^4$ is identical or different, and each independently, halogen; C1-20 hydrocarbon, or C1-20 hydrocarbon substituted with halogen, D is aluminum or boron.

12. The fiber according to claim 11, wherein the compound represented by the Chemical Formula 2 is methylaluminoxane, ethylaluminoxane, isobutylaluminoxane, or butylaluminoxane.

13. The fiber according to claim 11, wherein the compound represented by the Chemical Formula 3 is trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tollylaluminum, dimethylaluminum mexhoxide, dimethylaluminum ethoxide, trimethylboron, triethylboron, triisobutylboron, tripropylboron, or tributylboron.

14. The fiber according to claim 7, wherein the borated-based second cocatalyst is a borate-based compound represented by the following Chemical Formula 4 or 5:

$$[L-H]^+[Z(A)_4]^-$$ [Chemical Formula 4]

$$[L]^+[Z(A)_4]^-$$ [Chemical Formula 5]

wherein, in the Chemical Formulas 4 and 5,

L is identical or different, and each independently, neutral or cationic Lewis acid, each H is independently a hydrogen atom, Z is identical or different, and each independently, boron, and A is identical or different, and each independently, a C6-20 aryl or alkyl group substituted by halogen, a C1-20 hydrocaryl group, an alkoxy group, a phenoxy group, nitrogen, phosphorus, sulfur or oxygen atom.

15. The fiber according to claim 7, wherein the borated-based second cocatalyst is trityltetrakis(pentafluorophenyl)borate, N,N-dimethylaniliniumtetrakis(pentafluorophenyl)borate, trimethylammoniumtetrakis(pentafluorophenyl)borate, triethylammoniumtetrakis(pentafluorophenyl)borate, or tripropylammoniumtetrakis(pentafluorophenyl)borate.

16. The fiber according to claim 1, wherein the number of gels with a particle diameter of 250 μm or more is less than 500 per unit area (m²).

* * * * *